(12) United States Patent
Langford et al.

(10) Patent No.: US 6,742,594 B2
(45) Date of Patent: Jun. 1, 2004

(54) FLOWLINE JUMPER FOR SUBSEA WELL

(75) Inventors: Gawain Langford, Houston, TX (US); Francisco Dezen, Houston, TX (US); Lars-Petter Sollie, Houston, TX (US); Stephen P. Fenton, Houston, TX (US)

(73) Assignees: ABB Vetco Gray Inc., Houston, TX (US); ABB Offshore Systems, Inc., Houston, TX (US)

( * ) Notice: Subject to any disclaimer, the term of this patent is extended or adjusted under 35 U.S.C. 154(b) by 0 days.

(21) Appl. No.: 10/340,094

(22) Filed: Jan. 10, 2003

(65) Prior Publication Data

US 2003/0145997 A1 Aug. 7, 2003

Related U.S. Application Data
(60) Provisional application No. 60/354,612, filed on Feb. 6, 2002, and provisional application No. 60/425,377, filed on Nov. 12, 2002.

(51) Int. Cl.[7] ............................ E21B 29/12; F16L 1/028
(52) U.S. Cl. ...................... 166/350; 166/343; 166/366; 166/368; 405/158; 405/171
(58) Field of Search .................. 166/347, 346, 166/344, 350, 366, 368, 343; 405/158, 162, 169, 170, 171

(56) References Cited

U.S. PATENT DOCUMENTS

| | | | | |
|---|---|---|---|---|
| 3,220,477 A | * | 11/1965 | Jones | 166/351 |
| 3,431,739 A | * | 3/1969 | Richardson et al. | 405/169 |
| 3,482,410 A | * | 12/1969 | Roesky et al. | 405/169 |
| 3,495,658 A | * | 2/1970 | Johnson | 166/340 |
| 3,524,325 A | * | 8/1970 | Brown | 405/169 |
| 3,678,996 A | * | 7/1972 | Herd | 166/368 |
| 3,698,348 A | * | 10/1972 | Morgan | 114/245 |
| 3,732,923 A | * | 5/1973 | Fowler | 166/340 |
| 4,075,862 A | * | 2/1978 | Ames | 405/169 |
| 4,175,620 A | * | 11/1979 | Nolan et al. | 166/343 |
| 4,263,004 A | * | 4/1981 | Joubert et al. | 405/172 |
| 4,277,202 A | * | 7/1981 | Archambaud et al. | 405/169 |
| 4,400,110 A | * | 8/1983 | Beynet et al. | 405/224.2 |
| 4,541,753 A | * | 9/1985 | Langner | 405/166 |
| 4,544,036 A | * | 10/1985 | Saliger | 166/341 |
| 4,671,702 A | * | 6/1987 | Langner | 405/169 |
| 4,820,083 A | * | 4/1989 | Hall | 405/169 |
| 4,832,124 A | * | 5/1989 | Rayson | 166/339 |
| 4,906,137 A | * | 3/1990 | Maloberti et al. | 405/224.3 |
| 5,320,175 A | * | 6/1994 | Ritter et al. | 166/339 |
| 5,341,884 A | * | 8/1994 | Silva | 166/347 |
| 5,582,252 A | * | 12/1996 | Richmond et al. | 166/352 |
| 5,593,249 A | * | 1/1997 | Cox et al. | 405/191 |
| 5,807,027 A | * | 9/1998 | Ostergaard | 405/170 |
| 6,109,830 A | * | 8/2000 | de Baan | 405/170 |

\* cited by examiner

*Primary Examiner*—Robert E. Pezzuto
*Assistant Examiner*—Thomas A. Beach
(74) *Attorney, Agent, or Firm*—Bracewell & Patterson, L.L.P.

(57) ABSTRACT

A subsea well system has a flowline jumper that extends between components on the sea floor. The jumper has connectors on each end for connecting to the two components. At least a portion of the jumper is buoyant and sufficiently flexible to cause it to assume a vertical arcuate configuration when installed. One end of the jumper has a connector that has a mandrel that guides into a mating socket formed on the end of an arm. The arm is mounted to a ring that can be rotated to various orientations.

29 Claims, 4 Drawing Sheets

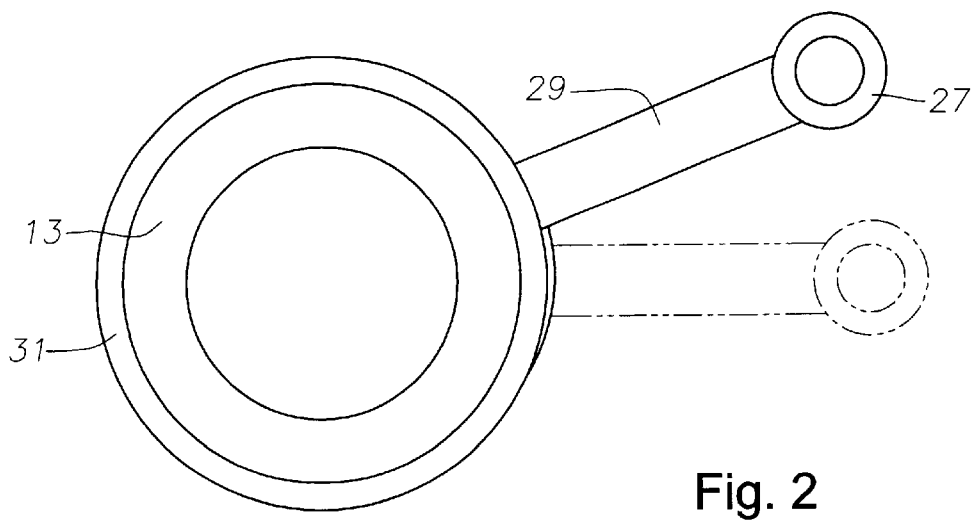
Fig. 2
Fig. 3
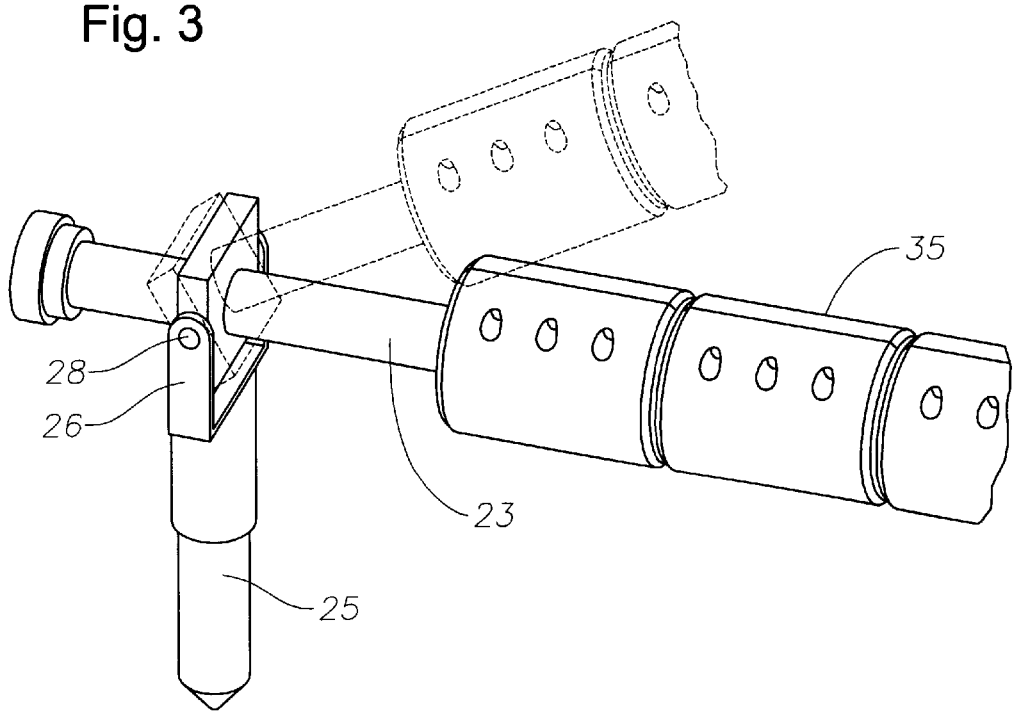

FLOWLINE JUMPER FOR SUBSEA WELL

This application claims priority from the provisional application Serial No. 60/354,612, filed Feb. 6, 2002, entitled "Flowline Jumper for Subsea Well" and provisional application Serial No. 60/425,377, filed Nov. 12, 2002, entitled "Drilling and Producing Deep Water Subsea Wells".

FIELD OF THE INVENTION

This invention relates in general to subsea well systems, and particularly to a flowline jumper extending from a subsea well to another subsea component which may be in the form of a manifold, flowline or daisy chain to another well.

BACKGROUND OF THE INVENTION

One oil and gas production technique for offshore wells utilizes subsea Christmas trees. The tree locates on top of the wellhead housing and contains valves for controlling the production. The tree also normally will have a choke and may have various monitors and flow measuring devices. The tree has a production outlet that typically connects to another subsea component, such as a manifold, that may be some distance away, such as 50 meters to several kilometers. A flowline jumper connects the subsea tree to the other component.

The flowline jumpers between the various components on the sea floor are typically rigid steel pipes that are laid horizontally on the sea floor. Prior to installation of the jumpers, the distances between the components are measured or calculated. Then pipes are fabricated to the desired length and provided with couplings on the ends for connecting between two components.

If the measurements are not precisely made or the components moved from originally planned locations, new jumpers may need to be fabricated. The distance and the orientation between the various subsea components must be known in advance before the flowline jumpers can be fabricated because the lengths will be critical. Also, after installation, if one of the components needs to be retrieved or moved, it is a time-consuming task to disconnect the flowline jumper from the component.

SUMMARY OF THE INVENTION

In this invention, a flowline jumper is provided that has a length greater than the distance between the two components that it is intended to connect. The flowline jumper has first and second connectors on opposite ends that are connected to the two components. At least a portion of the flowline jumper is buoyant and sufficiently flexible to cause that portion of the flowline to assume an arcuate configuration located in a vertical plane. The excess length and arcuate configuration reduces the need for the length of the flowline jumper to be precise. Also, the orientation may be changed more readily.

Preferably, at least one of the connectors on the flowline jumper is vertical so that it will stab vertically into a mating receptacle on one of the subsea components. Both of the connectors may be vertical. Alternately, one of the connectors may be horizontal. If so, this results in a portion of the flowline jumper being horizontally oriented and the other portion being arcuate.

The production tree is mounted to a wellhead housing. In one embodiment, the wellhead housing has a ring that is mounted to its exterior, the ring being selectively rotatable relative to the wellhead housing. An arm extends from the ring, the arm having a vertical socket. With the assistance of a remote operated vehicle (ROV), the ring can be rotated to position the socket at various orientations. The flowline from the tree aligns with the arm. The flowline jumper has a connector with a mandrel that stabs into the socket to align the flowline connector with the tree coupling. Preferably, the connector and the mandrel are hinged for ease in installation.

BRIEF DESCRIPTION OF DRAWINGS

FIG. 2 is a schematic top view of a portion of the flowline coupling of the tree of FIG. 1.

FIG. 3 is an enlarged perspective view of one connector of the flowline jumper for connecting to the tree of FIG. 1.

DETAILED DESCRIPTION OF THE INVENTION

Figure 1:
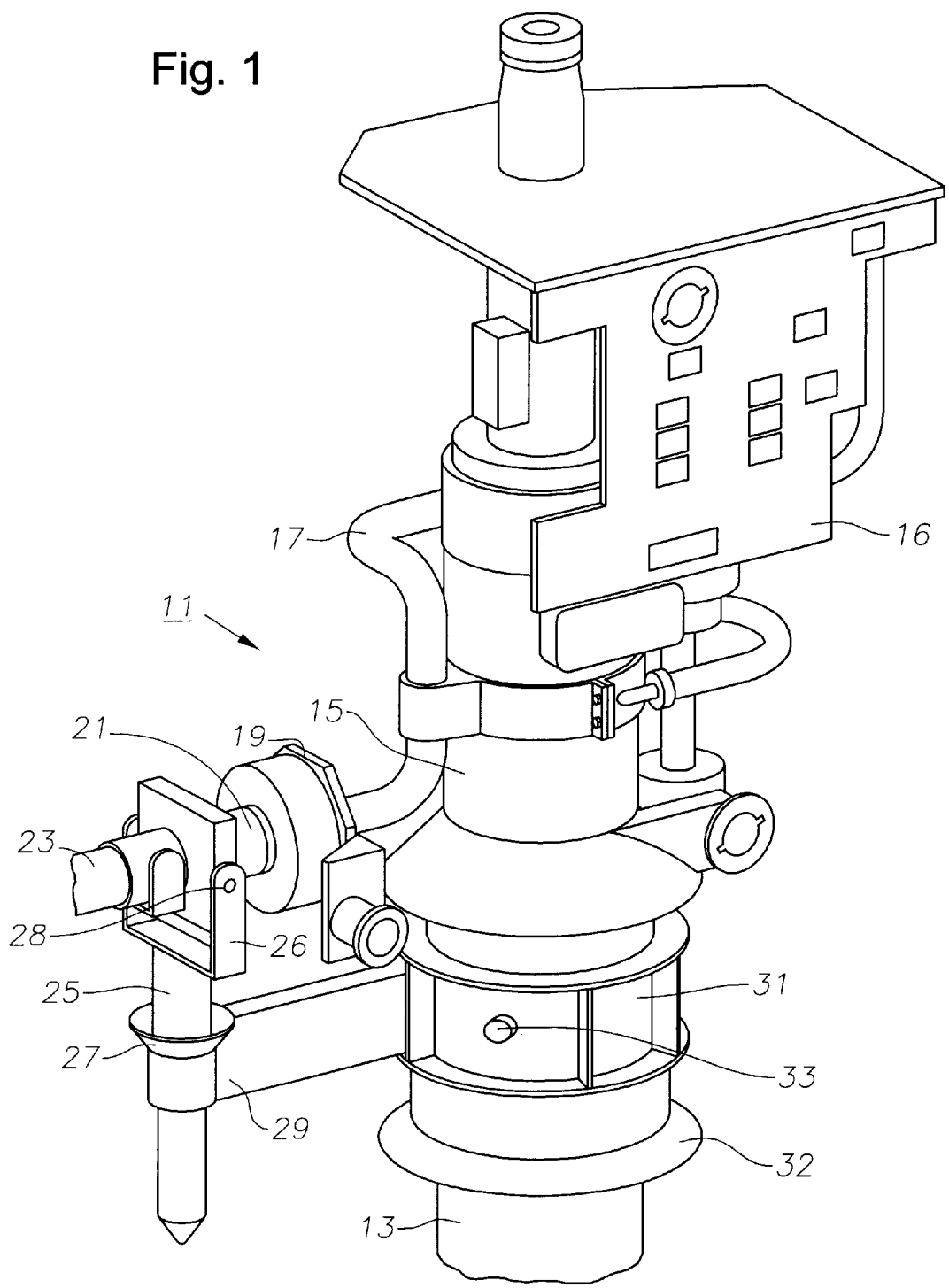
FIG. 1 is a perspective view of a tree and flowline coupling constructed in accordance with this invention.

The subsea well assembly 11 shown in FIG. 1 includes an outer wellhead housing 13 that is located at the upper end of the well at the sea floor. Outer wellhead housing 13 is a large diameter tubular member into which an inner or high pressure wellhead housing (not shown) lands. A tree 15 mounts on top of the inner wellhead housing. Tree 15 has a control assembly 16 mounted to it for controlling various valves (not shown) mounted to the tree. The valves control the flow of fluids within and from the tree. Tree 15 has a flow outlet 17 that is a tube that extends around a portion of the tree and terminates in a horizontally oriented coupling 19.

A flowline coupling 21 is shown aligned in position to mate with tree coupling 19. Couplings 19, 21 may be of variety of types including collet, clamp, flange or other types. Flowline coupling 21 is mounted to one end of a flowline jumper 23. A guide or mandrel 25 extends from flowline coupling 21 for reception within a socket 27. Mandrel 25 positions flowline coupling 21 in alignment with tree coupling 19 when jumper 23 is lowered into the sea from the surface. As shown in FIG. 3, a hinge mechanism 26 connects flowline coupling 21 and mandrel 25 to flowline jumper 23. Hinge mechanism 26 allows flowline jumper 23 to move to a position parallel to mandrel 25, as illustrated by the dotted lines in FIG. 5. In the connected position, coupling 21 is 90° relative to mandrel 25. Hinge mechanism 26 may be of a variety of type, and in this embodiment, hinge 26 is a clevis and a pair of pinions 28 that rotate within holes in the clevis.

Socket 27 is located on the end of an arm 29 that extends horizontally outward from a ring 31. Ring 31 has a downward facing funnel 32 to facilitate sliding ring 31 over outer wellhead housing 13 in this embodiment. Ring 31 is selectively rotatable relative to wellhead housing 13 as illustrated by the dotted lines of FIG. 2. Lock members 33, such as pins or screws (FIG. 1) will selectively lock ring 31 in a desired orientation. Lock members 33 are accessible by an ROV to tighten and loosen. Lock members 31 engage a mating slot in wellhead housing 13. Ring 31 and arm 29 are preferably installed on wellhead housing 13 before wellhead housing 13 is lowered into the sea. Subsequently, an ROV may be employed to rotate ring 31 to point arm 29 in a desired direction. An orientation sleeve that is part of a tubing hanger (not shown) is oriented with arm 29 when it is lowered into the high pressure wellhead housing. Any change in direction of arm 29 is performed before the tubing hanger is installed. Tree 15 engages the orientation sleeve (not shown) located within the inner wellhead housing above the tubing hanger as tree 15 is landing in the wellhead housing to orient flow outlet 19 in alignment with arm 29.

Referring again to FIG. 4, flowline jumper 23 may be a single integral conduit or a number of sections secured together, such as by threads, flanged ends, or welding. Flowline jumper 23 may be of carbon steel along with a number of other alloys such as titanium and chrome. Flowline jumper 23 may also be formed at least partially of composite materials of fiber in a resin. Furthermore, flowline jumper 23 could be formed of flexible pipes that are made of multiple articulated components that flex relative to each other. Flowline jumper 23 may have a single passage through it or multiple passages.

Figure 4:
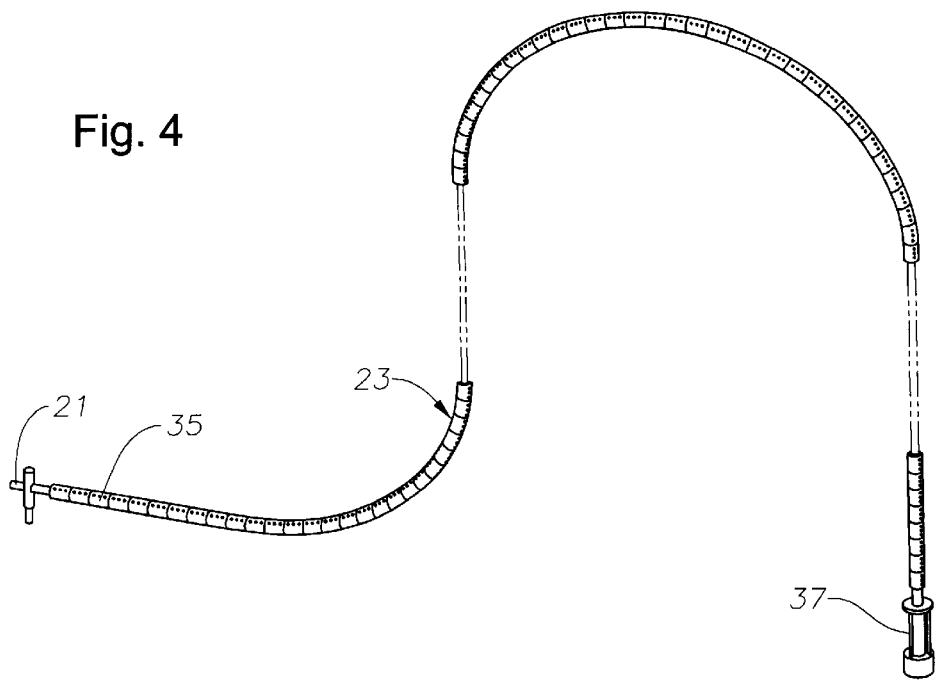
FIG. 4 is a perspective view of the flowline jumper of FIG. 3.

Flowline jumper 23 also has at least a portion that is buoyant. In this embodiment, a plurality of short buoyant segments 35 are secured over flowline jumper 23, forming a buoyant jacket. As shown in FIG. 4, segments 35 need not extend the full length of flowline jumper 23. However, they should extend sufficiently to cause flowline jumper 23 to be arcuate within its central section. The length of flowline jumper 23 relative to its diameter will cause a portion to flex into an arcuate shape due to buoyancy even if the conduit of flowline jumper 23 is of steel. The flexibility of flowline jumper 23 is preferably sufficient to avoid any permanent deformation due to the buoyancy of buoyant members 35. The buoyancy should be adequate to provide buoyancy to a portion of jumper 23 whether filled with water, hydrocarbon liquid or gas. Segments 35 may serve as bend restrictors to prevent excessive bending of the conduit of flowline jumper 23.

FIG. 4 shows a vertical connector 37 on the end opposite connector 21. Connectors 21 and 37 are preferably negatively buoyant for ease in installation. Connector 37, like connector 21, may be of a variety of types. When flowline jumper 23 is installed, a portion extending from connector 21 will be horizontal and a portion extending from vertical connector 37 will be vertical. Buoyant members 35 cause the portion adjacent vertical connector 37 to extend upward and curve over in an arcuate shape within a vertical plane. The curved portion has an apogee at its midpoint that is at a higher elevation than connectors 21, 37 after installation. The combination of the horizontal portion and arcuate portion over the length of jumper 23 may be termed a lazy wave.

Figure 5:
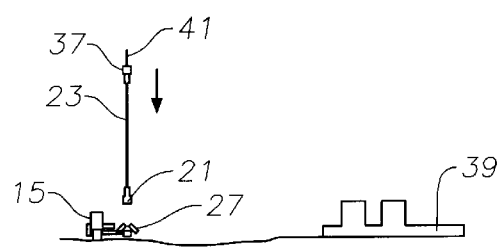
FIG. 5 is a schematic view of the flowline jumper of FIG. 3, shown being lowered into the sea.

FIG. 5 illustrates one method for connecting tree 15 to a second component, which in this case is a subsea manifold 39. The second component 39 could also be another flowline, or a daisy chain to another well. Manifold 39 receives flow from a number of subsea wells and routes that flow to further processing equipment. The second component 39 could include such equipment normally mounted to tree 15, such as a choke, production/injection flow isolation valve, multi-phase flow meters, erosion monitoring, corrosion monitoring and pressure and temperature monitoring.

The length of jumper 23 is greater than the horizontal distance between tree 15 and manifold 39. The additional length is sufficient to create the lazy wave configuration shown in FIGS. 4 and 9–12, however the precise configuration and the additional length of jumper 23 over the actual horizontal distance is not critical. The distances between tree 15 and manifold 39 may vary and could be as short as 30 meters and as long as several kilometers.

As shown in FIG. 5, a lift line 41 is secured to one of the ends of flowline jumper 23. In this embodiment, it is shown secured to second connector 37. The negative buoyancy of first connector 21 has caused it to assume a lower elevation than any other portion of jumper 23 as it is being lowered. Also, the negative buoyancy has caused mandrel 25 to hinge over to an orientation parallel with flowline jumper 23. Flowline jumper 23 is essentially straight and vertical in the positions of FIGS. 5–8.

Figure 6:
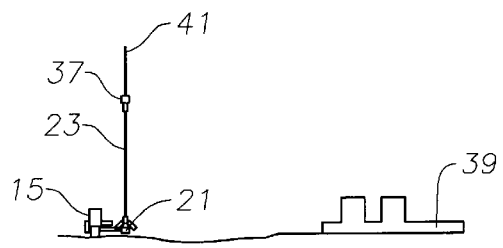
FIG. 6 is a schematic view of the flowline jumper of FIG. 3, shown being stabbed into the tree.
Figure 7:
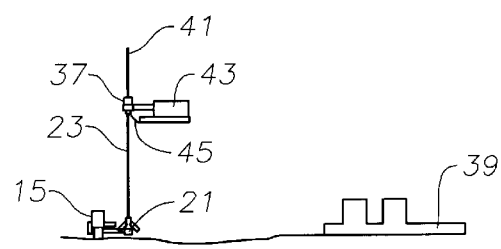
FIG. 7 is a schematic view of the flowline jumper of FIG. 3, showing a remote operated vehicle in the process of connecting to the flowline jumper.
Figure 8:
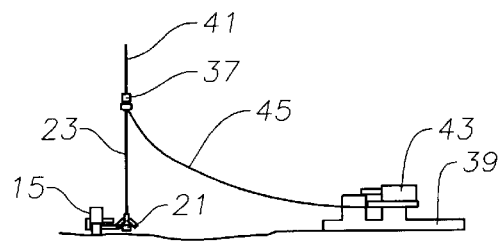
FIG. 8 is a schematic view of the flowline jumper of FIG. 3, showing the ROV landed on a subsea manifold and connected by a pull line to the flowline jumper.
Figure 9:
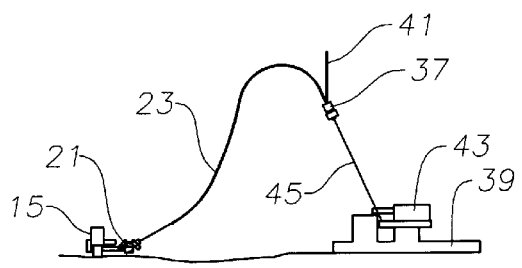
FIG. 9 is a schematic view of the flowline jumper of FIG. 3, showing the pull line being retracted by the ROV, drawing the second connector of the flowline jumper into alignment with the manifold.
Figure 10:
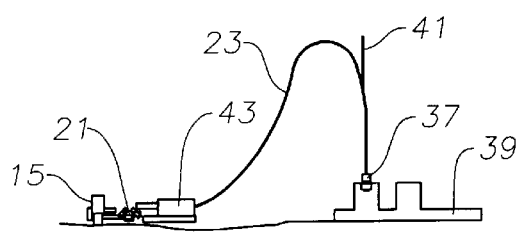
FIG. 10 is a schematic view of the flowline jumper of FIG. 3, showing the second connector of the flowline jumper being connected to the subsea manifold.
Figure 11:
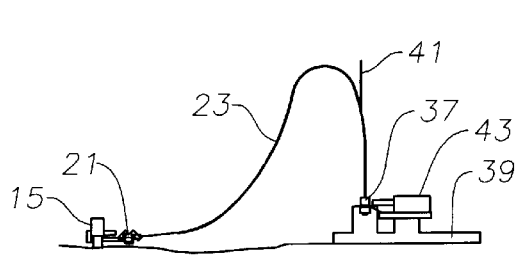
FIG. 11 is a schematic view of the flowline jumper of FIG. 3, showing the remote operated vehicle connecting the couplings of the flowline jumper and the tree to each other.

In FIG. 6, mandrel 25 (FIG. 1) is shown stabbing into socket 27 while lift line 41 is still attached. Remote cameras may be used for guiding mandrel 25 into socket 27. Referring to FIG. 7, while flowline jumper 23 is still vertical, an ROV 43 is shown attaching a pull line 45 to vertical connector 37. As shown in FIG. 8, ROV 43 reels out pull line 45 and lands on manifold 39. Lift line 41 still maintains flowline jumper 23 in the vertical orientation in FIG. 8. Then, as shown in FIG. 9, ROV 43 reels in pull line 45, causing second connector 37 to approach manifold 39. Hinge mechanism 26 (FIG. 1) allows first connector 21 and a portion of flowline jumper 23 to move to a horizontal position. FIG. 10 shows ROV 43 connecting second connector 37 to a suitable mandrel on manifold 39. Subsequently, as shown in FIG. 11, ROV 43 moves over into engagement with first connector 21. ROV 43 performs the actuation to cause first connector 21 to sealingly engage and secure to tree coupling 19 (FIG. 1).

Figure 12:
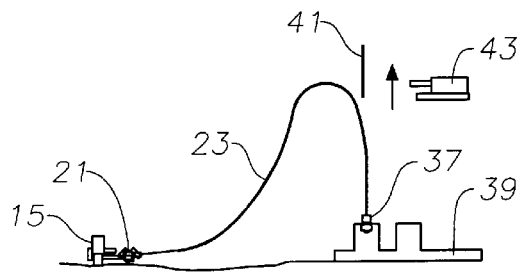
FIG. 12 is a schematic view of the flowline jumper of FIG. 3 showing the installation complete and the ROV being retrieved.

FIG. 12 illustrates flowline jumper 23 in the desired position, with lift line 41 removed and being retrieved as well as ROV 43. Buoyant members 35 cause a portion of flowline jumper 23 to assume an arcuate configuration while another portion is horizontal.

Figure 13:
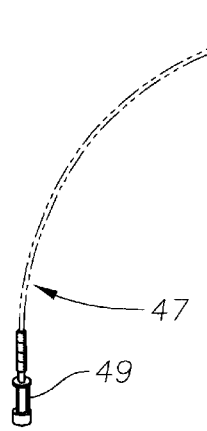
FIG. 13 is a perspective view of a second embodiment of a flowline jumper.

In the embodiment of FIG. 13, flowline jumper 47 may be constructed in the same manner as flowline jumper 23. It may contain a buoyant jacket (not shown) over all of its length or a portion. Both connectors 49, 51 are vertical types such as connector 37 (FIG. 4). Consequently, the buoyancy of flowline jumper 47 causes it to assume a single arcuate configuration.

The invention has significant advantages. The buoyant, flexible jumper reduces the need for critical pre-measurements and fabrication. The jumper may be readily installed by using a lift line with the assistance of an ROV. The rotatable ring and support arm mounted to the wellhead housing enables the orientation of the tree outlet to be changed after the wellhead housing has been installed in the sea floor.

While the invention has been shown in only a few of its forms, it should be apparent to those skilled in the art that it is not so limited but susceptible to various changes without departing from the scope of the invention.

We claim:

1. In a subsea well system having first and second components on a sea floor and spaced laterally apart from each other a selected distance, the improvement comprising:
   a flowline having a length greater than the distance between the components;
   first and second connectors on opposite ends of the flowline that are connected to the first and second components, respectively; and
   at least a portion of the flowline being buoyant and having a curved configuration with an apogee, the buoyancy causing the apogee to be above the sea floor and at a higher elevation than the first and second connectors after installation of the flowline has been completed.

2. The system according to claim 1, wherein the flowline comprises:
   a conduit; and
   a buoyant jacket surrounding at least a portion of the conduit.

3. The system according to claim 1, wherein the first connector configuration is located in a vertical plane after installation.

4. The system according to claim 1, wherein the second connector extends vertically into engagement with the second component.

5. The system according to claim 1, wherein one of the connectors extends horizontally into engagement with the first component after installation, and the other of the connectors extends vertically into engagement with the second component after installation.

6. The system according to claim 1, wherein the connectors extend vertically into engagement with the components.

7. The system according to claim 1, wherein the first component has a vertically oriented socket and a horizontally oriented coupling, and the first connector comprises:
   a horizontally oriented coupling that sealingly couples to the coupling of the first component; and
   a vertically oriented mandrel connected to the coupling of the first connector that inserts into the socket to guide the coupling of the flowline into alignment with the coupling of the first component.

8. The system according to claim 1, wherein the first component has a vertically oriented socket and a horizontally oriented coupling, and the first connector comprises:
   a horizontally oriented coupling that sealingly couples to the coupling of the first component;
   a vertically oriented mandrel connected to the horizontally oriented coupling that inserts into the socket to guide the coupling of the flowline into alignment with the coupling of the first component; and
   a hinge mechanism between the mandrel and the flowline that enables the coupling of the flowline to move between a parallel position with the mandrel and a perpendicular position to the mandrel.

9. In a subsea well system having first and second components spaced laterally apart from each other a selected distance, the improvement comprising:
   a flowline having a length greater than the distance between the components;
   first and second connectors on opposite ends of the flowline that are connected to the first and second components, respectively;
   at least a portion of the flowline being buoyant and sufficiently flexible to cause said portion of the flowline to assume a curved configuration; and wherein the first component comprises:
   a vertical tubular member;
   a ring mounted around the member;
   an arm extending laterally from the ring;
   a tube leading from the tubular member to the arm, the tube having a coupling on an end; and
   wherein the ring is selectively rotatable relative to the tubular member to position the coupling in a desired direction for connection with the flowline.

10. In a subsea well system having first and second components spaced laterally apart from each other a selected distance, the improvement comprising:
    a flowline having a length greater than the distance between the components;
    first and second connectors on opposite ends of the flowline that are connected to the first and second components, respectively;
    at least a portion of the flowline being buoyant and sufficiently flexible to cause said portion of the flowline to assume a curved configuration; and wherein the first component comprises: wherein the first component comprises:
    a vertical tubular member;
    a ring mounted around the tubular member;
    an arm extending laterally from the ring;
    a vertical socket located on an end of the arm;
    a tube leading from the tubular member to the arm adjacent the socket, the tube having a coupling on an end;
    wherein the ring is selectively rotatable relative to the tubular member to position the coupling in a desired direction for connection with the flowline; and the first connector comprises:
    a horizontally oriented coupling that sealingly couples to the coupling of the first component; and
    a vertically oriented mandrel that inserts into the socket to guide the coupling of the flowline into alignment with the coupling of the first component.

11. In a subsea well system having a subsea production tree having a flowline coupling spaced laterally from a flowline coupling of a processing component, the improvement comprising:
    a flowline having a length greater than the distance between the flowline couplings of the tree and the component;
    connectors on opposite ends of the flowline connected to the couplings for flowing fluids between the tree and the component; and
    the flowline having at least a portion with a curved configuration with a buoyant jacket located thereon, the jacket causing an apogee of the portion to float at a higher elevation than the connectors after installation.

12. The system according to claim 11, wherein one of the connectors extends horizontally into engagement with one of the couplings.

13. The system according to claim 11, wherein one of the connectors extends vertically into engagement with one of the couplings.

14. The system according to claim 11, wherein one of the connectors extends horizontally into engagement with one of the couplings, and the other of the connectors extends vertically into engagement with the other of the couplings.

15. The system according to claim 11, wherein both of the connectors extend vertically into engagement with the couplings.

16. The system according to claim 11, wherein:
the coupling of the tree is horizontally oriented;
the tree has a vertically oriented socket adjacent the coupling of the tree; and one of the connectors comprises:
a horizontally oriented coupling that sealingly couples to the coupling of the tree; and
a vertically oriented mandrel that inserts into the socket to guide the coupling of the flowline into alignment with the coupling of the tree.

17. In a subsea well system having a subsea production tree having a flowline coupling spaced laterally from a flowline coupling of a processing component, the improvement comprising:
a flowline having a length greater than the distance between the flowline couplings of the tree and the component;
connectors on opposite ends of the flowline connected to the couplings for flowing fluids between the tree and the component;
a buoyant jacket located on the flowline, the flowline being sufficiently flexible to cause at least a portion of the flowline to assume a vertical curved configuration;
a vertical tubular member on which the tree is mounted;
a ring mounted around the tubular member;
an arm extending laterally from the ring;
a tube leading from the tree to the arm, the coupling of the tree being located on an end of the tube; and
wherein the ring is selectively rotatable relative to the tubular member to position the coupling of the tree in a desired direction for connection with the flowline.

18. In a subsea well system having a subsea production tree having a flowline coupling spaced laterally from a flowline coupling of a processing component, the improvement comprising:
a flowline having a length greater than the distance between the flowline couplings of the tree and the component;
connectors on opposite ends of the flowline connected to the couplings for flowing fluids between the tree and the component;
a buoyant jacket located on the flowline, the flowline being sufficiently flexible to cause at least a portion of the flowline to assume a vertical curved configuration;
a vertical tubular member on which the tree is mounted;
a ring mounted around the tubular member;
an arm extending laterally from the ring;
a vertical socket located on an end of the arm;
a tube leading from the tree to the arm, the coupling of the tree being located on an end of the tube;
wherein the ring is selectively rotatable relative to the tubular member to position the coupling of the tree in a desired direction for connection with the flowline; and one of the connectors comprises:
a horizontally oriented coupling that sealingly couples to the coupling of the tree; and
a vertically oriented mandrel that inserts into the socket to guide the coupling of the flowline into alignment with the coupling of the tree.

19. A subsea well, comprising:
a tubular wellhead housing having an axis;
a production tree landed on the wellhead housing and having a production outlet;
a ring coaxially carried by the wellhead housing below the production tree;
an arm extending laterally from the ring;
a coupling located adjacent the arm and formed on the end of the production outlet for connection to a flowline; and
wherein the ring is selectively rotatable relative to the wellhead to position the arm at a desired orientation.

20. A subsea well, comprising:
a wellhead assembly having a production outlet;
a ring carried by the wellhead assembly;
an arm extending laterally from the ring;
a coupling located adjacent the arm and formed on the end of the production outlet for connection to a flowline;
wherein the ring is selectively rotatable relative to the wellhead assembly to position the arm at a desired orientation;
wherein the wellhead assembly comprises:
a wellhead housing;
a production tree mounted to the wellhead housing; and wherein
the ring is rotatably mounted to the wellhead housing; and the ring further comprises:
a plurality of lock elements mounted to an exterior of the ring for locking the ring in the desired orientation.

21. A subsea well, comprising:
a wellhead assembly having a production outlet;
a ring carried by the wellhead assembly;
an arm extending laterally from the ring;
a coupling located adjacent the arm and formed on the end of the production outlet for connection to a flowline;
wherein the ring is selectively rotatable relative to the wellhead assembly to position the arm at a desired orientation; and
a vertically oriented socket at an end of the arm for engagement by a mandrel of a flowline connector.

22. A method of transmitting fluids between subsea first and second components that area separated laterally from each other, comprising:
(a) providing a flowline with a length greater than the distance between the components, the flowline having at least a portion with an arcuate configuration;
(b) providing the portion of the flowline having the arcuate configuration with a buoyant member having sufficient buoyancy to cause said portion of the flowline to locate in a vertical plane when submersed;
(c) on a lift line, lowering the flowline and connecting ends of the flowline to the first and second components; and
(d) retrieving the lift line while leaving the buoyancy member permanently with the flowline so that the arcuate portion of the flowline remains in a vertical plane after installation.

23. The method according to claim 22, wherein step (b) comprises installing a buoyant jacket around said portion.

24. The method according to claim 22, wherein step (c) comprises stabbing one of the ends of the flowline horizontally into engagement with one of the components.

25. The method according to claim 22, wherein step (c) comprises stabbing at least one of the ends of the flowline vertically into engagement with one of the components.

26. The method according to claim 22, wherein step (c) comprises stabbing one of the ends of the flowline horizontally into engagement with one of the components and stabbing the other of the ends of the flowline vertically into engagement with the other of the components.

27. The method according to claim 22, wherein step (c) comprises stabbing both of the ends of the flowline vertically into engagement with the component.

28. A method of connecting a subsea tree assembly to a second subsea component, comprising:

(a) installing a wellhead housing on the sea bed;

(b) placing a ring around the wellhead housing, the ring having an arm extending laterally from the wellhead housing;

(c) with the assistance of an ROV, rotating the ring to point the arm in a desired direction after the wellhead housing has been installed on the sea bed;

(d) landing a tree on the wellhead housing, the tree having a production outlet with a tree coupling that is aligned with the arm;

(e) engaging a flowline connector of a flowline with the arm to support the flowline connector; then (f) connecting the flowline connector to the coupling of the production outlet.

29. The method according to claim 28, wherein step (e) comprises landing a mandrel in a vertical socket located at the end of the arm.

* * * * *

UNITED STATES PATENT AND TRADEMARK OFFICE
CERTIFICATE OF CORRECTION

PATENT NO. : 6,742,594 B2  
DATED : June 1, 2004  
INVENTOR(S) : Gawain Langford et al.

It is certified that error appears in the above-identified patent and that said Letters Patent is hereby corrected as shown below:

Column 6,  
Lines 29-30, delete "wherein the first component comprises:"

Signed and Sealed this

Thirty-first Day of August, 2004

JON W. DUDAS  
*Director of the United States Patent and Trademark Office*